UNITED STATES PATENT OFFICE.

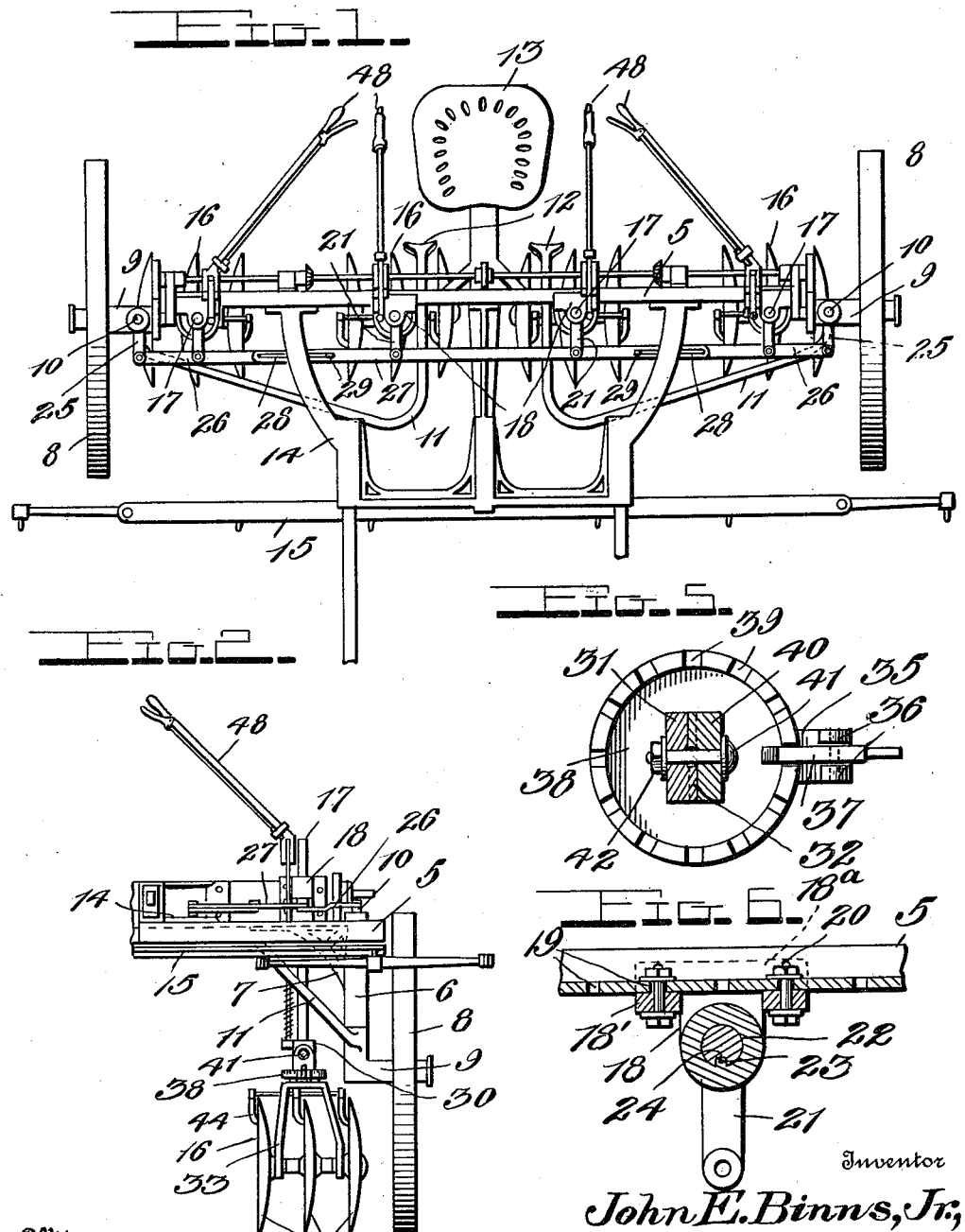

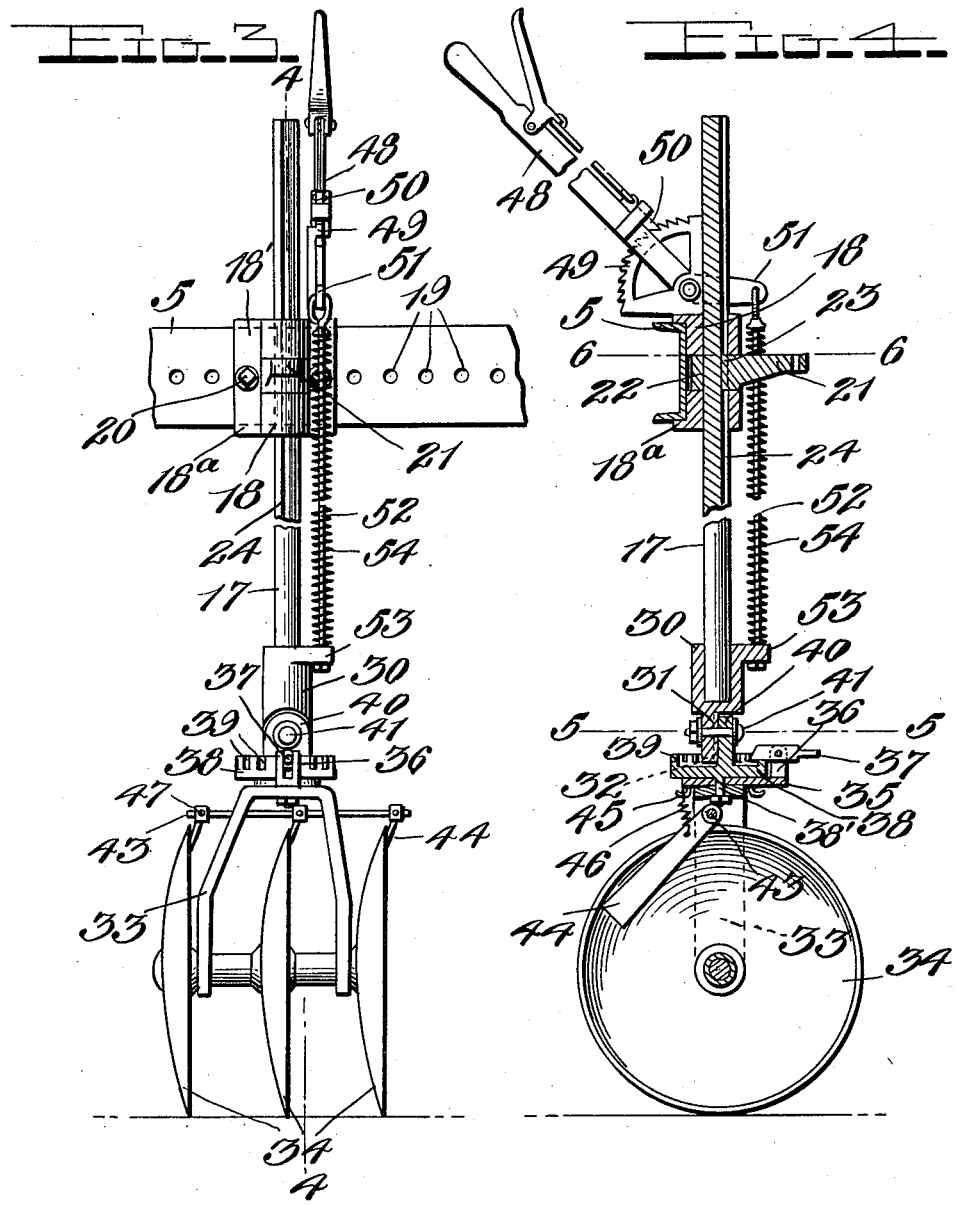

JOHN E. BINNS, JR., OF NASHVILLE, TENNESSEE.

CULTIVATOR.

1,013,269. Specification of Letters Patent. Patented Jan. 2, 1912.

Application filed April 10, 1911. Serial No. 620,065.

*To all whom it may concern:*

Be it known that I, JOHN E. BINNS, Jr., a citizen of the United States, residing at Nashville, in the county of Davidson and State of Tennessee, have invented certain new and useful Improvements in Cultivators, of which the following is a specification, reference being had to the accompanying drawings.

This invention relates to improvements in cultivators and more particularly to cultivators of that character employing a plurality of disk gangs, the invention having for its primary object the provision of new and novel means for mounting and adjusting the disk gangs.

A further object of the invention is to provide a machine of the above character including a wheel supported frame, a plurality of disk gangs vertically adjustable upon said frame, and means connected to the axle spindles of the wheels and common to all of the disk gangs to simultaneously adjust the gangs and dispose the same in the same rotative plane with the line of movement of the machine.

Still another object of the invention is to provide a plurality of disk carrying rods mounted upon the frame of the machine for vertical movement, manually operable means for independently adjusting said rods, and means for mounting the disk gangs upon the rods whereby they may be angularly positioned with relation to the longitudinal axis of the rod.

A still further object of the invention is to provide a plurality of rotatably mounted disk carrying rods arranged upon a wheel supported frame, the axles of the wheel being vertically disposed, a sectional bar connecting the wheel axles and connections between the disk carrying rods and said bar sections to rotate said rods in the turning movement of the machine to dispose the disks carried by the rods for rotative movement in line with the movement of the machine, said sectional connecting bar positioning certain of the disks at different angles with relation to each other and with relation to the remaining disks.

With the above and other objects in view, the invention consists of the novel features of construction, combination and arrangement of parts hereinafter fully described and claimed, and illustrated in the accompanying drawings, in which—

Figure 1 is a top plan view of a cultivator embodying my improvements; Fig. 2 is a fragmentary front elevation of the machine illustrating the mounting of the supporting wheels; Fig. 3 is an enlarged detail elevation of one of the disk gangs; Fig. 4 is an enlarged vertical section taken on the line 4—4 of Fig. 3; Fig. 5 is a section taken on the line 5—5 of Fig. 4; and Fig. 6 is a section taken on the line 6—6 of Fig. 4.

Referring in detail to the drawings 5 designates the main frame of the machine which consists of a transverse angle bar to the ends of which the vertical tubular legs or standards 6 are secured, said legs being braced and connected to the transverse frame bar 5 by means of the diagonal bars 7. The supporting wheels 8 have the inner ends of their axles 9 tubularly formed and vertically disposed to receive the lower end of a pivot rod 10 which extends therethrough and through the tubular legs 6. A foot bar 11 is integrally formed with the vertical tubular portions of the wheel axles, and these foot bars extend upwardly and inwardly and are provided on their inner ends with the foot plates 12 disposed adjacent to the operator's seat 13 which is suitably mounted upon the main frame bar 5. Thus the operator may readily turn the supporting wheels 8 to direct the movement of the machine. A forwardly extending U-shaped frame bar 14 is secured to the transverse bar 5 and has arranged thereon suitable draft attachments 15.

Upon the transverse bar 5 of the wheel supported frame, a plurality of disk gangs 16 are arranged. Any desired number of these gangs may be employed and each of them includes a vertically disposed disk carrying rod 17 which is mounted for movement in a bearing plate 18 adjustably mounted on the bar 5, said bar being provided with a plurality of openings 19 to receive the fastening bolts 20 which are disposed through the flanges 18′ formed on the bearing plate 18. The upper and lower ends of this bearing plate are also provided with flanges 18ᵃ for engagement over the upper and lower longitudinal edges of the frame bar 5. It will thus be seen that the disk gangs may be relatively adjusted by removing the bolts 20 and sliding the bearing plates 18 on the bar 5 until the desired distance between adjacent gangs is obtained. The central tubular portion of the bearing plate through which the disk carrying rod 17 extends is recessed to receive the end of an arm 21 which is provided with an opening 22 to receive the rod 17. This arm is also provided with a key 23 which extends into the opening 22 and is adapted to engage in a longitudinal key-way or slot 24 in the rod 17. Thus it will be seen that while the disk carrying rod may move vertically through the end of the arm, said rod is keyed to the arm for rotative movement therewith. An arm 25 is also secured to the upper end of each of the pivot rods 10 upon the lower ends of which the supporting wheels are mounted. A sectional bar connects the arms 25 on the axle spindles and the arms 21 which are arranged upon the disk carrying rods so that, when the axle spindles are rotated, the disk rods will also be rotated to angularly position the disk gangs which are carried thereby. It will be obvious, that in turning the machine, the outer gangs of disks adjacent to the supporting wheels will be disposed in different angular positions with relation to each other and to the wheels of the machine. The outer sections 26 of the connecting bar are therefore pivotally connected to the arms 21 of the outermost gang rods 17 and to the arms 25 of the pivots 10. To the intermediate section 27 of this bar the arms 21 of the intermediate gang rods are pivotally connected. The ends of the bar section 27 are movably disposed upon the inner end portions of the bar sections 26 and are provided with the longitudinal slots 28 to receive the pins 29 fixed in the inner ends of the bar sections 26. These pins are normally disposed in the inner ends of the slots 28. It will therefore be seen that in turning the machine in either direction, the outer bar sections 26 which are connected to the pivot rods of the wheel axles may move in an outward direction independently upon the ends of the central bar section 27. The pin 29 secured in one of the end sections of the bar engaging in the end of the slot 28 moves the intermediate bar section 27 thereby rotating the rod 17 of the intermediate disk gangs to angularly position the same. The operator may adjust either of the supporting wheels and the outer disk gangs in order to pass around obstructions in the path of the machine.

Means are provided for manually adjusting the disk gangs upon the frame of the machine to raise or lower the same so that they will cut into the earth to the desired depth. To the lower end of each of the disk carrying rods a sleeve 30 is rigidly secured and has integrally formed therewith a plate 31 having a serrated face 32 upon which the disk gang is adapted to be mounted as hereinafter described. The disk shaft 32 is mounted in the ends of a yoke 33. Upon this shaft a plurality of disks 34 are rotatably mounted. While I have illustrated three disks in each gang, it will be understood that if desired a greater number of the disks may be employed. To the intermediate portion of the yoke 33 a laterally extending arm 35 is secured and has formed thereon the spaced ears 36 between which a latch plate 37 is pivotally mounted. A plate 38 having a pivot stud 38' is mounted upon the yoke 33 and has formed thereon a plurality of vertically disposed spaced teeth 39 between which the latch plate 37 is adapted to engage. The plate 38 also has centrally formed thereon an ear or lug 40, one face of which is serrated for engagement with the serrated face of the plate 31 which is formed upon the sleeve 30 fixed to the lower end of the rod 17. A bolt 41 is disposed through the co-engaged plates 31 and 40 and has a nut 42 threaded upon one end to rigidly secure the disk gang upon the lower end of the rod 17. It will be obvious that by simply loosening the bolt 41 and disengaging the serrated faces of the plates 40 and 31, the disks may be angularly disposed with relation to the longitudinal axis of the rod 17 upon which they are mounted. In this manner the disk gangs may be easily and quickly adjusted to work upon the side of an incline or hill. A rod 43 is secured in the yoke 33 and carries a plurality of scraper blades 44 which engage with the disks to remove the earth which may cling thereto. To the under side of the arm 35 at diametrically opposite points the hooks 45 are secured. A spring 46 is secured to one of these hooks and to one of the scraper blades 44. The rod 43 is rotatable in the yoke and this spring serves to hold the scraper blades which are mounted on said rod in engagement with the concave faces of the disks 34. The positions of the disks are adapted to be reversed so as to throw the earth either toward the plants being cultivated or away from the same, and in order to reverse the positions of the scraping blades, the end of the spring is disconnected from one of the hooks and engaged with the opposite side of the yoke.

Upon the frame bar 5 the adjusting levers 48 are mounted, said levers being pivoted at their lower ends upon a rack segment 49 and carrying the usual spring pressed locking dog 50 for engagement with the teeth of the ratchet. At its pivoted end the lever is formed with an extension or arm 51 to which the upper end of a rod 52 is connected. The other end of this rod is connected to an arm 53 formed upon the upper end of the sleeve 30. A spring 54 is arranged upon said rod between the arm 53 and a collar 55 secured on the rod 52. It will thus be seen that by manipulating the levers 48 the disk gangs may be independently adjusted with relation to the earth's surface, the springs 54 acting to force the disks into the ground. This vertical adjustment of the disk gangs it will be observed is entirely independent of their angular adjustment which is effected in the turning movement of the supporting wheels 8. The adjusting levers 48 of the outer disk gangs are angularly disposed and inwardly extended to a point adjacent the operator's seat so that they may be conveniently grasped and manipulated in the adjustment of the gangs.

From the above it is believed that the construction and operation of my improved disk cultivator will be readily understood without requiring any further explanation. The disk gangs may be easily and quickly adjusted to any desired angle with relation to the line of movement of the machine, or positioned to throw the earth toward or from the plants being cultivated. The gangs may also be readily raised or lowered to increase or decrease the quantity of earth disposed about the stalks of the plants.

The various elements of my improved mechanism for positioning the disk gangs are of extremely simple construction and may be readily replaced at slight expense, thus reducing the cost of repairs to a minimum. The mechanism as a whole whereby the various adjustments are obtained is comparatively simple so that the cost of manufacture of such machines is not materially increased over the common cultivator of this character.

While I have shown and described the preferred construction and arrangement of the various elements, it will be understood that the invention is susceptible of considerable modification in the form, proportion and minor details of construction without departing from the essential feature or sacrificing any of the advantages thereof.

Having thus described the invention what is claimed is:—

1. In a disk cultivator, a wheel supported frame, the spindles of the wheel axles being vertically disposed, a plurality of disk gangs mounted upon said frame, each of said gangs comprising a disk carrying rod rotatably mounted upon the frame, a laterally extending arm on said rod, an arm secured to the upper end of each of the axle spindles and a bar consisting of a plurality of relatively movable sections pivotally connecting the arms on the axle spindles and the disk carrying rods to angularly dispose the disk gangs in the turning movement of the wheels.

2. In a disk cultivator, a wheel supported frame, a plurality of disk gangs each consisting of a disk carrying rod, a bearing plate for said rod adjustable on the frame, said rod having rotative and vertical movement in the bearing plate, a sectional bar connecting the wheel axles, and means connecting said bar and the disk carrying rods, said rods being vertically movable with respect thereto, said connecting means being adapted to rotate the disk carrying rods to simultaneously dispose the disk gangs at an angle when the wheels are turned.

3. In a disk cultivator, a wheel supported frame, a plurality of disk gangs each consisting of a disk carrying rod, a bearing plate for said rod adjustable on the frame, said rod being rotatably mounted in the bearing plate, an arm mounted on said rod, said rod being movable through the same and having a longitudinal key slot, a key formed on the arm extending into said slot, and means connecting the arm on each of the disk carrying rods with the wheel axles to simultaneously dispose the disk gangs at an angle when the wheels are turned.

4. In a disk cultivator, a wheel supported frame, a plurality of disk gangs each consisting of a vertically disposed rod mounted upon said frame, a disk carrying yoke on the lower end of the rod, a sectional bar connecting the wheel axles and said disk carrying rods to simultaneously position the disk gangs in parallel relation with the line of movement of the machine when said machine is turned, and reversible scraper blades mounted in said yoke and yieldingly held in engagement with the disks.

In testimony whereof I hereunto affix my signature in the presence of two witnesses.

JOHN E. BINNS, Jr.

Witnesses:
D. W. BINNS,
V. B. ELAM.